March 20, 1962 R. H. OWENS 3,025,603
DISTANCE-RATE COMPUTER AND/OR INDICATOR
Filed April 17, 1959 2 Sheets-Sheet 1

Rhea H. Owens
INVENTOR.

BY Clarence A. O'Brien
and Harvey B. Jacobson
Attorneys

March 20, 1962 R. H. OWENS 3,025,603
DISTANCE-RATE COMPUTER AND/OR INDICATOR
Filed April 17, 1959 2 Sheets-Sheet 2
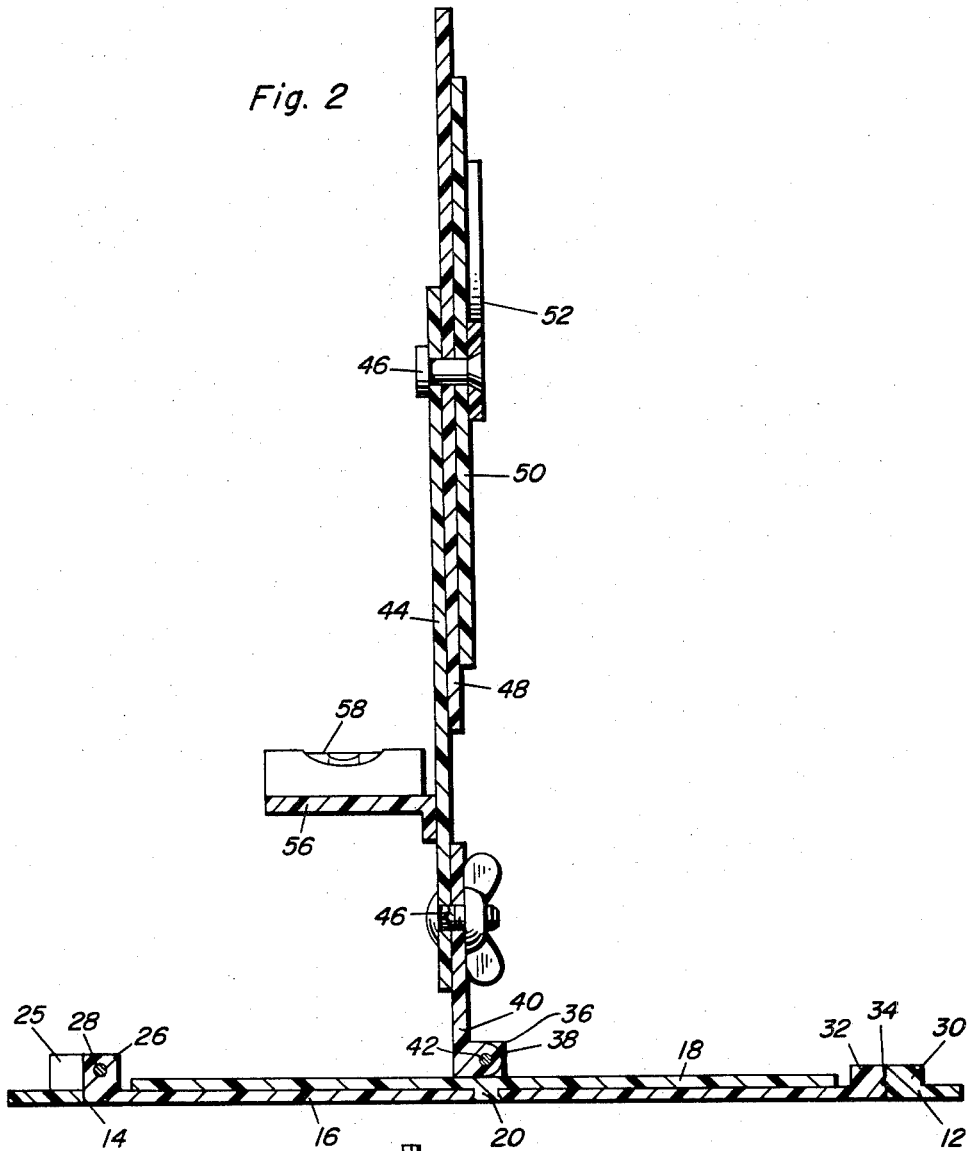
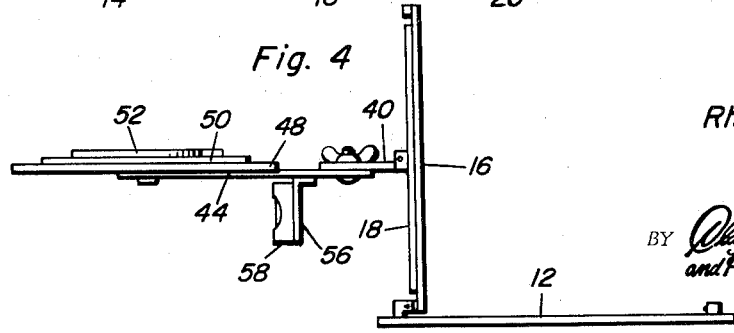
Rhea H. Owens
INVENTOR.

United States Patent Office 3,025,603
Patented Mar. 20, 1962

3,025,603
DISTANCE-RATE COMPUTER AND/OR
INDICATOR
Rhea H. Owens, 600 W. 10th Ave., Amarillo, Tex.
Filed Apr. 17, 1959, Ser. No. 807,054
2 Claims. (Cl. 33—69)

The present invention generally relates to a computer that is particularly useful in aircraft and may be employed to compute or indicate the distance or rate of movement of an aircraft.

Pilots such as commercial pilots that fly over the same route become familiar with certain landmarks which they use to judge their position and to determine the point at which they will begin their descent for landing. However, when a pilot is new to an area or a particular route, he lacks these landmarks and consequently must use his own judgment in determining his distances, bearings and letdown points. Generally, an error in judgment can be corrected by altering altitude or direction but such errors in judgment are wasteful of time and fuel. In certain instances, such errors in judgment have other more serious consequences such as the creating of a dangerous condition which could result in a crash. Therefore, it is the primary object of this invention to provide a relatively simple device which will enable the pilot to readily compute certain factors such as would be known so that other unknown factors may be determined.

The present invention is useful in determining the distance to a particular point if the altitude above a point is known. If the forward velocity is known, the rate of descent to intercept a point such as the end of a runway may be determined. Conversely, if the rate of descent has been decided upon, the letdown point may be determined. Of course, the point in question must be visible by the pilot of the plane.

Another object of the present invention is to provide a computer or indicator for aircraft which is simple in construction, easy to install, easy to use, dependable, of utmost simplicity and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a vertical sectional view taken substantially upon a plane passing along section line 2—2 of FIGURE 1;

FIGURE 4 is a side elevation of the present invention illustrating another manner in which the device may be used.

Figure 1:
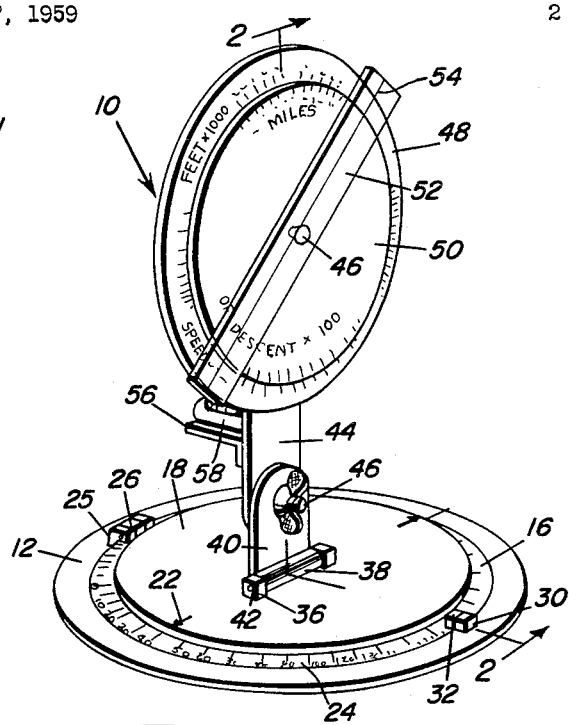
FIGURE 1 is a perspective view of the present invention.
Figure 3:
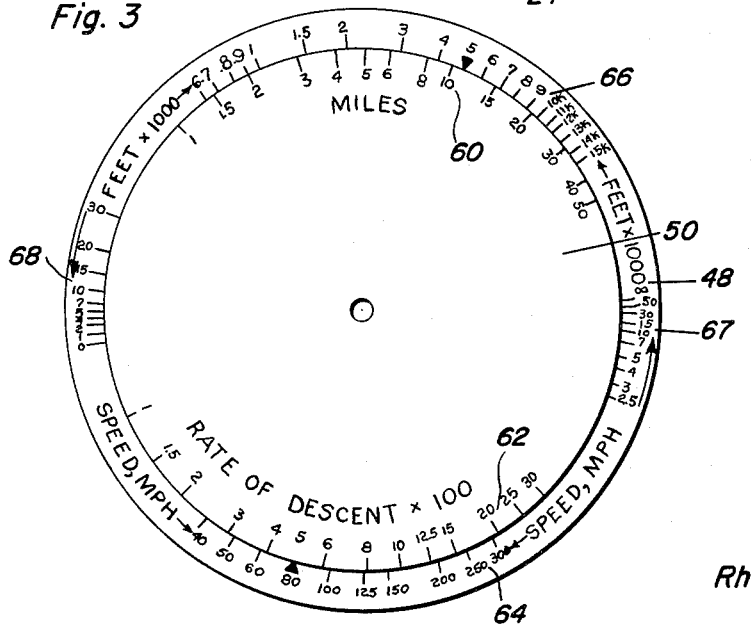
FIGURE 3 is a face view of the vertically disposed disks showing the scales thereon.

Referring now specifically to the drawings, the numeral 10 generally designates the computer or indicator of the present invention which includes an annular base member 12 having an enlarged circular opening 14 for receiving a base plate 16 of circular construction with the base plate 16 having a plate 18 rotatably connected thereto by a depending stud 20. The plate 18 is circular and is of less diameter than the base plate 16 and is provided with diametrically opposed index arrows 22 for association with degree graduations 24 on the base plate 16.

The annular base member 12 is provided with a pair of generally L-shaped lugs 25 having an upper portion extending into overlying relation to the edge of plate 16 and receiving therebetween an upstanding lug 26 on the base plate 16 with a hinge pin 28 interconnecting the base member 12 and the base plate 16. The diametrically opposed portion of the base member 12 is provided with an upstanding lug 30 while the diametrically opposed portion of the base plate 16 is provided with an upwardly extending lug 32 with there being frictional coacting catch means 34 in the form of conventional detents for releasably retaining the base plate 16 within the confines of the base member 12 but with the frictional catch permitting pivotal movement of the base plate 16 and disk 18 to a vertical position as illustrated in FIGURE 4.

Disposed centrally on the disk 18 is a pair of upwardly projecting lugs 36 receiving a hinge barrel 38 on a lug 40. A hinge pivot pin 42 connects the lug to the brackets 36 thereby enabling the upstanding lug 40 to swing about the axis of the pin 42. The hinge barrel 38 is rounded off in a manner to clear the disk 18 when turned on the pin 42.

The lug 40 is detachably and adjustably secured to an upstanding strap or bracket 44 which overlaps the upper end of the lug 40 and is releasably secured thereto by a thumb nut and bolt 45 as illustrated in FIGURE 2.

The upper end of the standard 44 is provided with a rotatable pin 46 extending through the plate 44 and a first circular disk 48 fixed to standard 44 and a second solid disk 50 overlying the disk 48 and having a lesser dimension are supported by pin 46. Mounted on one end of the pin 46 is an indicator bar 52 having a sight line 54 thereon. The vertical strap or bracket 44 is provided with a laterally extending bracket 56 carrying a spirit bubble level 58 thereon for maintaining the disks 48 and 50 in a vertical plane.

Figure 5:
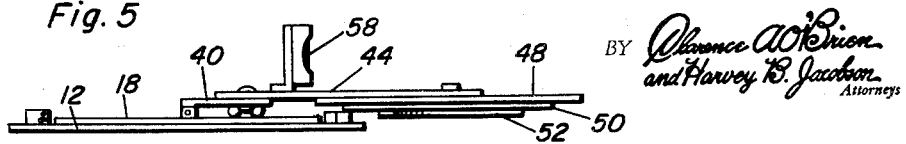
FIGURE 5 is a side elevation of the present invention illustrating the device in folded condition.

As illustrated in FIGURE 4, the device may be used with the disk 18 in a vertical position and the disks 48 and 50 in a horizontal position and FIGURE 5 illustrates the device in folded or collapsed condition for storage.

The disk 50 is provided with a miles scale designated by the numeral 60 and also a rate of descent scale 62, while the disk 48 is provided with a speed scale 64 and a distance or altitude scale 66 with the various scales having logarithmically arranged graduations, numerical indicia and descriptive indicia and with there being certain index and reference marks. Two triangular marks are shown which in the underlying relations represent constants, such for example as the ratio of miles to thousands of feet. It is also pointed out that the disk 48 is provided with another pair of scales 67 and 68 having their graduations spaced according to different trigonometric functions of inclination angle of the line of sight.

In determining ground distance from aircraft to an object on the ground it is assumed that the altitude is known and in this particular instance, the altitude is 10,000 feet. The sight or hair line 54 is aimed at the object on the ground and the reading on scale 67 under the hair line is read and we will assume that the reading is 15 on the scale 67. The inner disk 50 is then rotated until 15 on the scale 60 rests under the upper black triangle appearing in scale 66. The true distance to the object is then read on the scale 60 by reading on the scale 60 opposite to the altitude which appears on scale 66 which in this case was 10,000 feet which reading will be 30 with the true distance being 30 miles.

In the determination of rate of descent necessary for an aircraft to intercept a desired point on the ground, the scales used are scales 64, 68 and 62. Assuming that the aircraft's letdown speed is 100 miles per hour, the hair line or sight is aimed at point of interception at which time the hair line rests over the number 4 in the scale 68. The inner disk 50 is then rotated until 4 on the scale 62 rests above the black triangle again representing a computational constant on the scale 64. Then by reading opposite the letdown speed of 100 miles per hour on the mlies per hour scale 64 the required letdown rate will be 500 feet per minute or 5 on the rate of descent scale 62.

For determining the bearing angle, the index 22 and the bearing scale or degree scale 24 is used. The degree scale is mounted so that the zero points are straight ahead in the aircraft and when mounted in this manner, the entire vertical assembly may be turned to the left or the right and the bearing angle of any point may be read from the compass. By taking two distance and bearing measurements on the same point and by knowing the time between readings and the air speed, the wind drift angle and ground speed may be determined by means of various well known computations.

Thus, with the present invention, a person unfamiliar with terrain and landmarks may readily make various computations and receive immediate indications from such computations for properly controlling an aircraft especially when landing.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A computing and indicating device comprising a base member, an upstanding member connected to the base member, a pair of vertically disposed disks on said upstanding member, one of said pair of disks being fixed and the other disk being supported for rotation about a generally horizontal axis, a hair line carrying member mounted on the upstanding member for rotation in relation to the disks, each of said disks having a plurality of graduated scales thereon comprising logarithmic scales representing computational factors, and the fixed disk further comprising scales representing different functions of sight line inclination, the scales on one disk being movable therewith in relation to the scales on the other disk and the hair line carrying member being mounted for independent movement about said axis whereby the hair line may be sighted at an object and orientated in relation to the fixed vertical disk, the scales on the rotatable vertical disk indicating an answer to computations involving said factors when associated with the hair line, said base member including a rotatable horizontal disk, said upstanding member being attached to the horizontal disk for pivotal movement about a generally horizontal axis whereby the pair of vertical disks may be swung downwardly to a position generally parallel to the base member, said upwardly extending member being provided with a laterally extending bracket, and a horizontal spirit level mounted on said laterally extending bracket, said base member including an annular member, a circular plate disposed in the annular member, said horizontal disk being mounted on said plate, and means hingedly connecting the plate to the annular member at one edge of the plate for movement of the plate to a vertical position.

2. The structure as defined in claim 1 wherein said circular plate is provided with degree graduations thereon, said horizontal disk having an index mark thereon for registry with the degree graduations.

References Cited in the file of this patent
UNITED STATES PATENTS

| | | |
|---|---|---|
| 1,439,218 | Banacalari | Dec. 19, 1922 |
| 2,253,844 | Cassavant | Aug. 26, 1941 |
| 2,482,749 | Eckert | Sept. 27, 1949 |

FOREIGN PATENTS

| | | |
|---|---|---|
| 771,627 | France | July 30, 1934 |